United States Patent [19]

Sugiyama et al.

[11] Patent Number: 5,426,659
[45] Date of Patent: Jun. 20, 1995

[54] AXIAL FLOW TYPE LASER OSCILLATOR

[75] Inventors: Tsutomu Sugiyama, Osaka; Doukei Cho, Higashiosaka, both of Japan

[73] Assignee: Matsushita Electric Industrial Co., Ltd., Kadoma, Japan

[21] Appl. No.: 166,631

[22] Filed: Dec. 15, 1993

[30] Foreign Application Priority Data

Dec. 28, 1992 [JP] Japan .................. 4-347985

[51] Int. Cl.⁶ ..................... H01S 3/041; H01S 3/22
[52] U.S. Cl. ........................... 372/58; 372/34; 372/61; 372/65
[58] Field of Search .............. 372/55, 58, 59, 65, 372/61, 34

[56] References Cited

U.S. PATENT DOCUMENTS

| | | | |
|---|---|---|---|
| 3,673,442 | 10/1973 | McMahan | 372/61 |
| 4,242,646 | 12/1980 | Macken | 372/61 |
| 4,573,162 | 2/1986 | Bakowsky et al. | 372/61 |
| 4,624,001 | 11/1986 | Gürs | 372/58 |
| 4,757,511 | 7/1988 | Klingel et al. | 372/58 |
| 4,823,355 | 4/1989 | Koseki | 372/61 |

FOREIGN PATENT DOCUMENTS

0215458  3/1987  European Pat. Off. ........... 372/58

*Primary Examiner*—Rodney B. Bovernick
*Assistant Examiner*—Robert McNutt
*Attorney, Agent, or Firm*—Cushman, Darby & Cushman

[57] ABSTRACT

An axial flow type laser oscillator has a laser resonator having a first gas discharge tube (5a) and a second gas discharge tube (5b) connected coaxially, serially and linearly connected (5a, 5b) to form an integral gas discharge tube (5a+5b) and a resonator base (9) containing a gas distribution paths therein for distributing the laser medium gas to both ends of the integral gas discharge tube (5a, 5b) and disposed in substantial parallelism along the laser resonator and holds both ends of said integral gas discharge tube; the resonator base is held at one end by a pin-bearing and the other end by a roller bearing, so that no stress is given to the integral gas discharge tube (5a+5b) even at temperature rise of the laser medium gas.

12 Claims, 4 Drawing Sheets

AXIAL FLOW TYPE LASER OSCILLATOR

BACKGROUND OF THE INVENTION

1. Field of the Invention

The present invention relates to an improvement in an axial flow type laser oscillator to be used for laser cutting machines or the like.

2. Description of the Related Art

Figure 3:
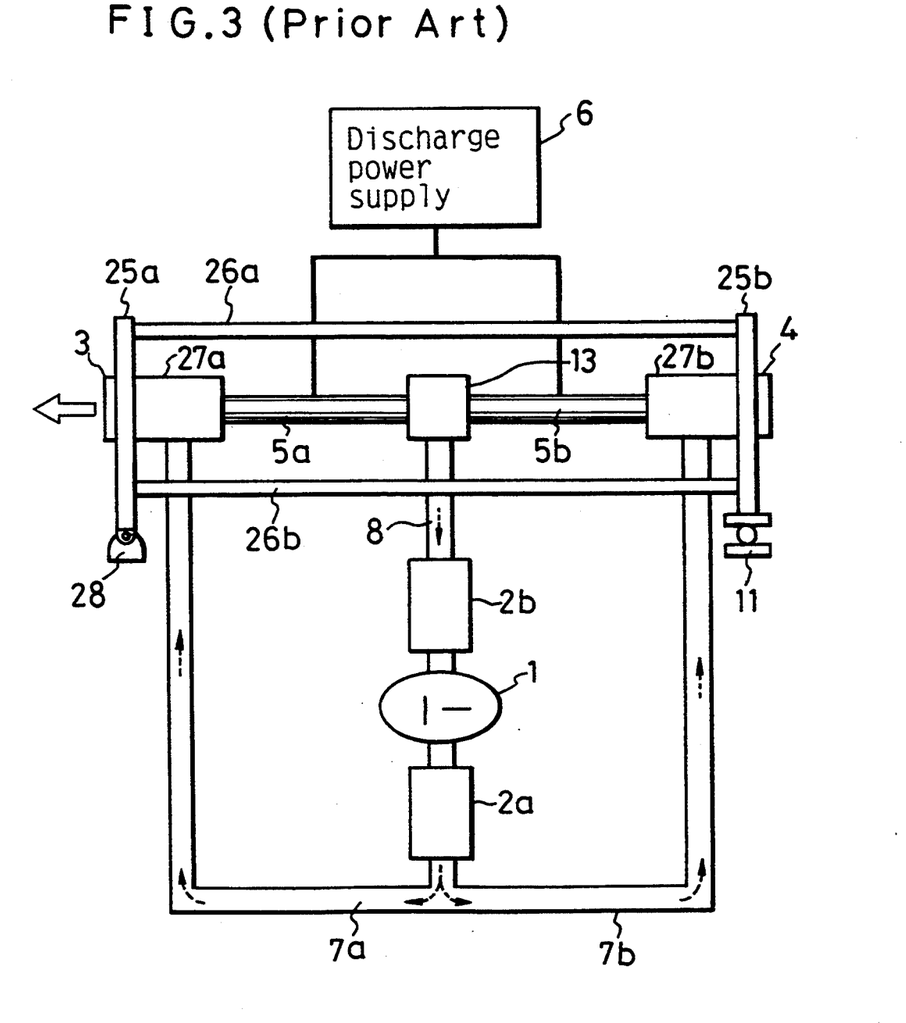
FIG. 3 is an elevation view showing the constitution of an axial flow type laser oscillator of prior art.

The following, is an explanation of the prior art axial flow type laser oscillator. As shown in FIG. 3, a prior art axial flow type laser oscillator comprises a gas blower 1, gas cooling units 2a and 2b provided at an inlet port and an outlet port of the gas blower 1, an output mirror 3, a total reflecting mirror 4, gas discharge tubes 5a and 5b, a discharge power supply 6 (e.g. D.C. power source or radio frequency oscillator), gas supply tubings 7a and 7b, gas outlet tubing 8, a rolling slider 11, a gas outlet block 13, an output mirror holder 25a, a total reflecting mirror holder 25b, resonator supporting rods 26a and 26b, gas feeding blocks 27a and 27b, and a resonator supporting metal block 28.

The mutual relations and actions of the above-mentioned structural elements of prior art axial flow type laser oscillator are explained below. As shown in FIG.3, the holder 26a and 26b respectively for holding the output mirror 3 and the total reflecting mirror 4 are mounted at both ends of the resonator supporting rods 26a and 26b. The output mirror 3, the total reflecting mirror 4, the gas discharge tubes 5a and 5b are all placed in a manner such that they are arranged on a common axial line. A gas laser medium is supplied to the two gas discharge tubes 5a and 5b at an equal flow rate from the gas supply tubings 7a and 7b by the gas blower 1 through the gas feeding blocks 27a and 27b, which are attached to the mirror holders 25a and 25b, respectively. The gas supplied to the gas discharge tubes, as described above, is excited by the discharge, which takes place in the gas discharge tubes caused by the current fed from the discharge power supply 6. A laser output light, which is not shown in the drawing, is issued through the output mirror 3. The gas laser medium, which is heated by the discharge and passed through the gas discharge tubes 5a and 5b, is collected at the gas outlet block 13, which is located at the center of the resonator. The gas laser medium is led out of outlet block 13 through the gas outlet tubing 8. The led out gas laser medium is cooled at the gas cooling unit 2b connected in the gas outlet tubing 8 and then returned to the gas blower 1.

The gas laser medium having passed through the gas discharge tubes 5a and 5b is cooled at the gas cooling unit 2b located at the inlet port of the gas blower 1. Therefore, the gas laser medium temperature at the outlet port of the gas cooling unit 2b becomes close to that of the coolant, such as water, which is supplied to the gas cooling unit. However, for cooling the gas laser medium which is heated up by the discharge at a time of constant operation sufficiently after starting the discharge, the temperature of the coolant rises substantially in proportion to the amount of energy exchanged from the gas laser medium to the coolant. Accordingly, the temperature of the gas laser medium at the outlet port of the gas cooling unit 2 rises by an amount of temperature rise of the coolant.

As a result, temperature variations of normally between 3° to 5° C. appear on the gas laser medium temperature at the outlet port of the gas cooling unit 2b caused by the presence or absence of the discharge, although it depends also upon the heat capacity of the coolant and the discharge input. Because this temperature variation remains even after the gas laser medium passes through the gas blower 1 and the gas cooling unit 2a, at a time when the laser oscillator is turned on, or at a time when the discharge input power is changed for adjusting the laser output power, expansion or contraction takes place on the gas supply tubings 7a and 7b owing to the temperature variations of the gas laser medium passing through the gas supply tubings 7a and 7b.

Expansions and contractions taking place on the gas supply tubings 7a and 7b propagate up to the mirror holders 25a and 25b. Consequently, if any non-uniform expansions and contractions on the gas supply tubings 7a and 7b are present, there arises the problem that the optical axis of the resonator deviates and hence the laser output power level fluctuates.

OBJECT AND SUMMARY OF THE INVENTION

The present invention solves the problem described above, and provides an axial flow type laser oscillator whose laser output is well stabilized.

The present invention stabilizes the output in an axial flow type laser oscillator to be used for laser machining apparatus or the like.

The axial flow type laser oscillator in accordance with the present invention comprises:

- a laser resonator having a first gas discharge tube and a second gas discharge tube which are coaxially, serially and linearly connected by a gas outlet block thereby constituting an integrated gas discharge tube for generating electric discharges in a gas laser medium therein, an output mirror and a total reflection mirror which are fixed on respective ends of the integral gas discharge tube,
- a gas blower for circulating the gas laser medium through the gas discharge tubes,
- gas supply tubings connecting from the gas blower to the gas discharge tubes,
- gas outlet tubing connecting through the gas outlet block from proximal ends of the gas discharge tubes to the gas blower,
- at least one gas cooling unit connected on the gas supply tubings or gas outlet tubings,
- a discharge power supply for supplying a power to generate the electric discharges,
- a resonator base containing a gas distribution paths connecting from the gas supply tubings and to a distal end of the first gas discharge tube and to a distal end of the second gas discharge tube and also disposed in substantial parallelism along the laser resonator in a manner to hold, by its holding members at both end parts, the respective distal ends of the gas discharging tubes, and
- a connecting gas feeding block supporting a near-end part of the resonator base and connected to the gas supply tubings.

The stabilization of output is achieved by forming the resonator over tile resonator base which is configured like an oblong box shaped frame or base and serves to hold both ends of the integrated gas discharge tube and also to supply the gas laser medium to the above-mentioned respective distal ends from the gas blower.

Furthermore, the axial flow type laser oscillator of the present invention comprises:

a laser resonator having a first gas discharge tube and a second gas discharge tube which are coaxially, serially and linearly connected by a gas outlet block thereby constituting an integrated gas discharge tube for generating electric discharges in a gas laser medium therein, an output mirror and a total reflection mirror which are fixed on respective ends of the integral gas discharge tube, a gas blower for circulating the gas laser medium through the gas discharge tubes, gas supply tubings connecting from the gas blower to the gas discharge tubes, gas outlet tubing connecting from gas outlet parts of the gas discharge tubes to the gas blower, at least one gas cooling unit connected on the gas supply tubings or gas outlet tubings, a discharge power supply for supplying a power to generate the electric discharges, a resonator base containing a gas distribution paths connecting from the gas supply tubings and to a distal end of the first gas discharge tube and to a distal end of the second gas discharge tube and also disposed in substantial parallelism along the laser resonator in a manner to hold, by its holding members at both end parts, the respective distal ends of the gas discharging tubes, and gas cooling means which is provided with flow-rate adjustable means for adjusting flow-rate of coolant medium and is disposed on the output end of the gas blower, wherein the flow rate is adjusted corresponding to an output power set for the laser oscillator.

The stabilization of the output is achieved by adjusting the flow-rate of the coolant medium, such as water, to be supplied to the cooling means.

By the above-mentioned constitution, non-uniform thermal expansion taking place on the gas supply tubing or on the resonator itself caused by the gas temperature variations can be eliminated. Thereby, deviations of the optical axis of the resonator is suppressed and the stabilization of the laser output can be achieved.

BRIEF DESCRIPTION OF THE DRAWINGS

It will be recognized that some or all of the Figures are schematic representations for purposes of illustration and do not necessarily depict the actual relative sizes or locations of the elements shown.

DESCRIPTION OF THE PREFERRED EMBODIMENT

Figure 1A:
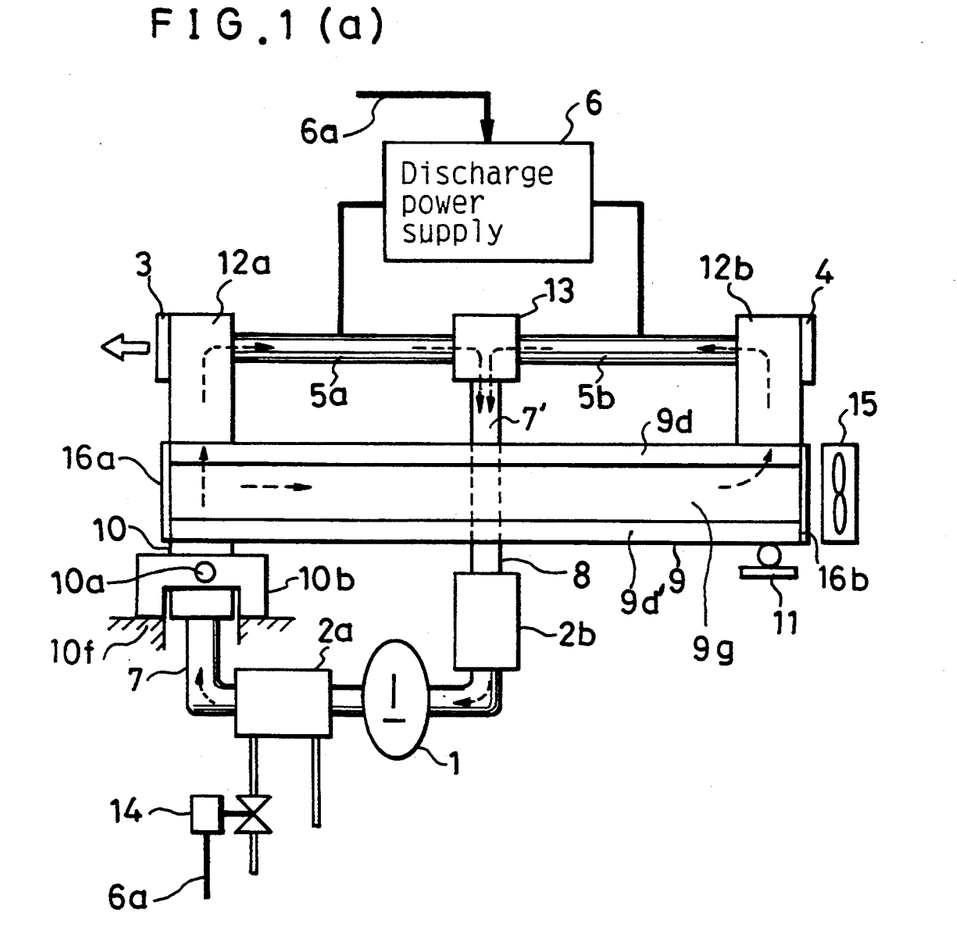
FIG. 1(a) is an elevation view of the whole apparatus of a first working example of the present invention.
Figure 1B:
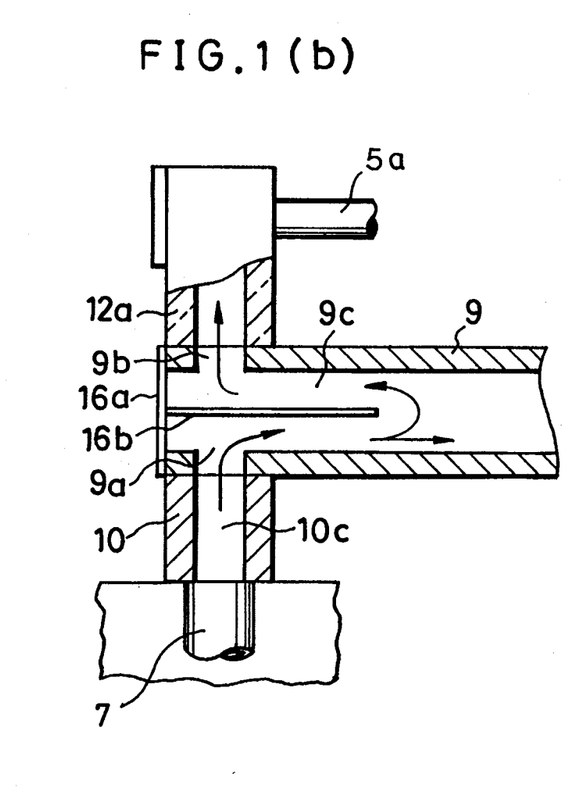
FIG. 1(b) is a cross-sectional view taken by a vertical plane including the laser optical axis of the principal part of the first working example of the present invention.
Figure 1C:
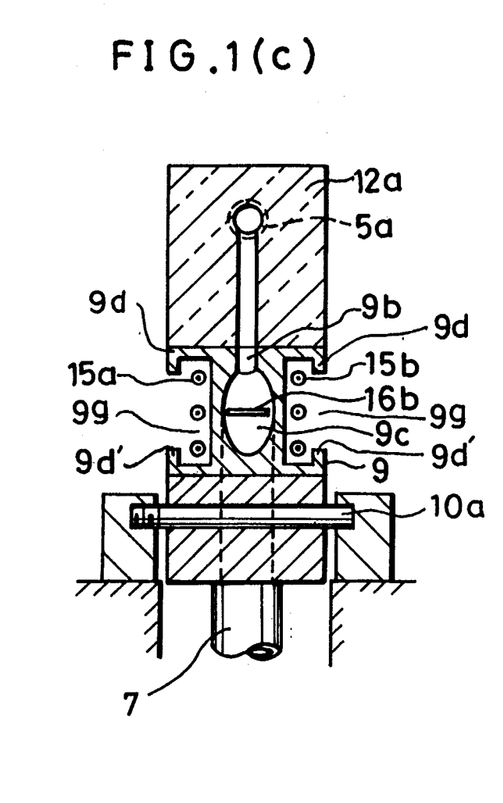
FIG. 1(c) is a cross-sectional view taken by a vertical plane perpendicular to the laser optical axis of the principal part in the first working example of the present invention.
Figure 2A:
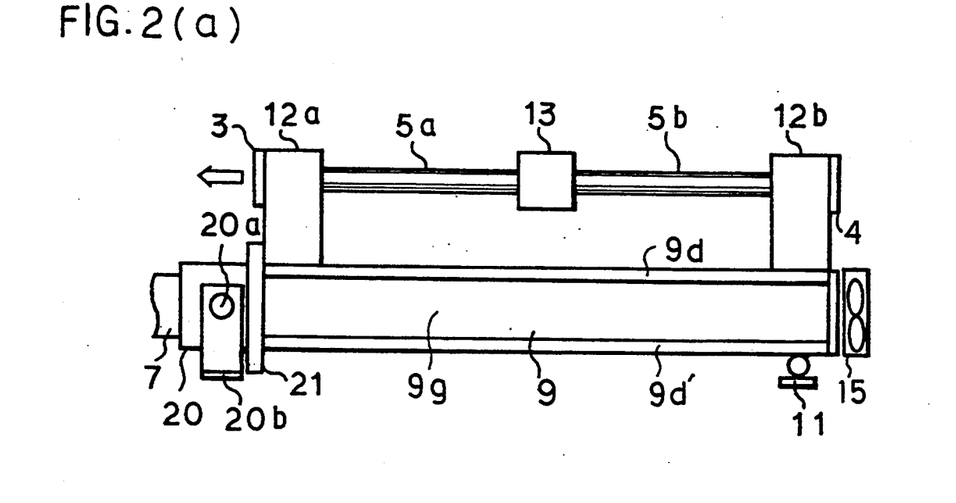
FIG. 2(a) is an elevation view of a resonator part a second working example of the present invention.
Figure 2B:
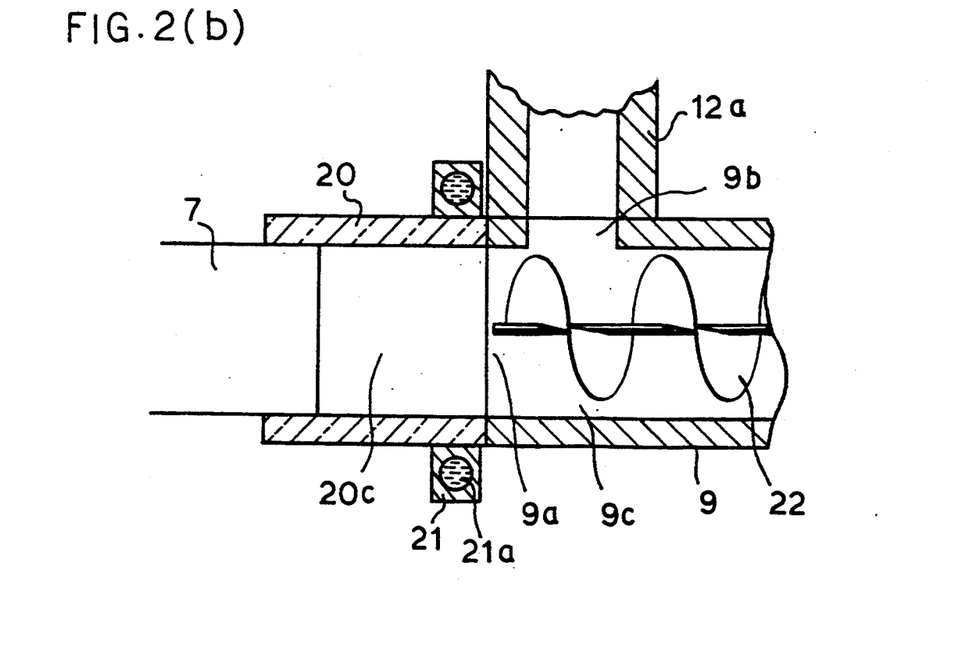
FIG. 2(b) is a cross-sectional view taken by a vertical plane including the laser optical axis of the principal part in a second working example of the present invention.

In the following, the present invention is elucidated in detail on preferred embodiments with reference to FIG. 1(a), FIG. 1(b), FIG. 1(c) showing the first embodiment and, FIG. 2(a) and FIG. 2(b) showing the second embodiment.

In FIG. 1(a) through FIG. 2(b) showing a first and a second embodiments of the present invention, the same numerals are given on corresponding parts to those in the prior art of FIG. 3.

[FIRST EMBODIMENT]

As shown in FIG. 1, an axial flow type laser oscillator embodying the present invention comprises: a pair of gas discharge tubes 5a and 5b connected in series and in linearity by a gas outlet block 13 and held between an output mirror holder 12a and a total reflecting mirror holder 12b, thereby forming a coaxial, linear and integrated gas discharge tube; a first gas cooling unit 2b connected by a gas outlet tubing 7' to the outlet port of the gas outlet block 13; a gas blower 1 connected at the outlet port of the first gas cooling unit 2b; a second cooling unit 2a connected to the output port of the gas blower 1; a coolant flow-rate adjuster 14 for adjusting cooling rate of the second cooling unit 2a corresponding to a set laser output value by receiving an adjusting signal 6a; a connecting gas feeding block 10 which connects output port of the second cooling unit 2a via a gas supply tubing 7 to a resonator base 9. The resonator base 9 is configured in an oblong box-shaped frame or base, and is for holding both ends of the integrated gas discharge tube, and further is for distributingly sending the gas laser medium to the above-mentioned both ends. A discharge power supply 6 is coupled for generating electric dischargings in the gas discharge tubes 5a and 5b. The discharge power may be known D.C. power or known microwave power depending on kinds of laser oscillation.

An output mirror 3 is attached to the output mirror holder which hold the above-mentioned one end or the first distal end of the first gas discharge tube 5a, and permits the generated laser light to be emitted therethrough.

A total reflection mirror 4 is attached to the total reflecting mirror holder 12b, which hold the above-mentioned one end or the second distal end of the second gas discharge tube 5b.

The resonator base 9 has an intake port 9a at the left bottom part of FIG. 1(b), which port is connected through the gas feeding block 10 to the gas supply tubing 7, and further has a first gas distribution port 9b disposed immediately above the gas intake port 9a and connected to the left end part of the first gas discharge tube 5a through the output mirror holder. Furthermore, the resonator base 9 has a screen guide plate 16b which is held by a front cover plate 16a horizontally between the gas intake port 9a and the first gas distribution port 9b. By means of the screen guide plate 16b, about a half portion of the intaken gas is conducted rightward to a second gas distribution port (not shown) connected to the total reflecting mirror holder 12b, while the other half portion of the intaken gas is conducted upward into the first gas distribution port 9b.

A pair of groove-shaped spaces 9g are formed on both side faces of the resonator base 9 in a manner embraced between upper projected wings 9d with its end edge bent down and the lower projected wings 9d' with its end edge bent up. A blower 15 is provided facing to one end of the resonator base 9, in a manner to blow air streams into the groove-shaped spaces 9g along the resonator base 9, so that temperature of the resonator base 9, hence the temperature of the gas laser medium flowing thereinside is made very uniform along the length of the resonator base 9.

As is shown in FIG. 1(a) through FIG. 1(c), the gas discharge tubes 5a and 5b are connected to the output mirror holder 12a and the total mirror holder 12b, respectively, at their respective distal ends, and connected to the gas outlet block 13 at their respective proximal ends. The output mirror 3, the total reflecting mirror 4, and the gas discharge tubes 5a, 5b are disposed coaxially, in a manner to form a resonator.

The mirror holders 12a and 12b are fixed onto both end parts of the resonator base 9 and fixed on an upper flat face formed by the upper and lower projected wing parts 9d (FIG. 1(c)) of the resonator base 9.

The connecting gas feeding block 10 is fixed on the lower side face of the resonator base 9 near its end with output mirror 3. And a rolling slider 11 is fixed on the lower side face of the resonator base 9 near its end with the total reflecting mirror 4. And the resonator consisting of the gas discharge tubes 5a, 5b, the minor holders 12a, 12b, the output mirror 3, the total mirror 4, the gas outlet block 13, and the resonator base 9 holding the above-mentioned components all are supported at its left end part (of FIG. 1(a)) by a pin-supporting bearing 10b, which is fixed on a frame 10f and rotatably holds resonator supporting a pin 10a held by side walls of the connecting gas feeding block 10, and at its right end part (of FIG. 1(a)) by the rolling slider 11, which is provided at the other end of the resonator base 9.

The cooling air blower 15 is disposed facing to the end face of the resonator base 9 at side of the total reflecting mirror 4, so that it blows the air streams 15a and 15b toward the space surrounded by the upper and the lower projected wing parts 9d, 9d' of the resonator base 9.

The control valve 14 for cooling water flow rate is connected to the cooling water tubing of the gas cooling unit 2a which is provided at the outlet port of the gas blower 1. The control valve 14 controls the cooling water flow rate responding to the output setting signal 6a.

The gas flow screen guide plate 16b is fixed inside the front cover 16a, which is attached to the end part of the resonator base 9. Since the gas flow screen guide plate 16b is disposed at approximately the half height of the gas flow-through hole 9c provided inside the resonator base 9 in the direction of parallel with the opening plane of the connecting port 9a, it screens the distribution port 9b, which is for supplying the gas laser medium to the output mirror holding mount 12a, from the connecting port 9a which connects it to the connecting gas feeding block 10 of the resonator base 9.

Furthermore, in the mirror holder 12b, which is provided at the end of total reflecting mirror 4 of the resonator base 9, an opening for supplying the gas laser medium is provided.

The operation of the first embodiment of the axial flow type laser oscillator constituted as above is as follows:

Into those two axial flow type gas discharge tubes 5a and 5b, gas laser medium is divided equally. And the equally divided gas laser medium is respectively supplied through the gas supply tubing 7, a resonator base 9, and mirror holders 12a and 12b by the gas blower 1, similarly as has been explained in the conventional example. And the gas laser medium is excited by the electric discharge produced by the power from the discharge power supply 6, which is controlled by the output setting signal 6a. The oscillating laser light bounces forth and back while it is amplified between the output mirror 3 and the total reflecting mirror 4, and finally taken out through the output mirror 3. The gas laser medium, whose temperature is raised up by the discharge in the gas discharge tubes 5a and 5b, is gathered though the gas outlet block 13 and cooled in the gas cooling unit 2b. Then the gas laser medium is sent back again by the gas blower 1 through the gas supply tubing 7 and the gas cooling unit 2a, to the gas discharge tubes 5a and 5b.

Although the gas laser medium makes the tubing 7 expand and contract by its temperature variations during its passage through the gas supply tubing 7 similarly as in the conventional example, the optical axis of the resonator is not deviated by the expansion and contraction of the gas tubing 7, since it is connected to the resonator base 9 only by the connecting gas feeding block 10, which is fixed by the resonator supporting rod 10a and the rod supporting bearing 10b at one end of the resonator base 9.

At the time when it passes through the connecting port 9a of the resonator base 9, the gas laser medium enters into the output mirror holder 12a after making a detour around the gas flow screen guide plate 16b. As a result, even when the temperature of the gas laser medium varies, the gas laser medium does not hit the wall of the gas flow-through hole 9c inside the resonator base 9, and therefore a local heating or cooling of the resonator base 9 is prevented, thus the whole of the resonator base 9 exhibits the temperature change of uniform distribution following the temperature variation of the gas laser medium.

Since the upper and lower projected wing 9d, 9d' of the resonator base 9 are bent in a manner to form a groove-shaped spaces which are parallel with the resonator base 9, they act as guides for the air streams 15a and 15b produced by the air blower 15. Thereby, air streams 15a and 15b from the blower 15 are formed along the side walls of the resonator base 9. As a result, the temperature distribution of the resonator base 9 is made uniform from the outside by the air streams 15a and 15b.

Furthermore, the cooling water flow rate control valve 14 adjusts to increase the flow rate of the cooling water supplied to the gas cooling unit 2a, when the output setting of the discharge power supply 6 is raised. And it reduces the cooling water supply when the output setting is lowered. The flow rate which is controllable by the flow rate control valve 14 is set to such an amount that the temperature of the gas laser medium passed through the gas cooling unit 2a can be lowered down to a temperature there at the time before the discharge-starts. As a result, the temperature of the gas laser medium at the outlet port of the gas cooling unit 2a is cooled and kept at an almost constant temperature regardless of the levels of the discharge input. Thereby, the gas laser medium of a constant temperature can be supplied.

In accordance with the first working example of the present invention as has been described above, the temperature variation of the gas laser medium is prevented regardless of the amount of the electric power input. Thereby, the distortion of the gas supply tubing is eliminated. Furthermore, even when the temperature variation takes place on the gas laser medium, it is devised that the temperature variation is made to be distributed over the whole of the resonator. And furthermore, the resonator does not suffer the influence of the expansion and contraction of the gas supply tubing. Thereby, the distortion of the resonator can be completely eliminated.

[SECOND EMBODIMENT]

FIG. 2 is a drawing showing a second embodiment of the present invention. As shown in FIG. 2, though omitting the detailed explanation of those parts common with those in the axial flow type laser oscillator of the first working embodiment, an axial flow type laser oscillator of the second embodiment comprises: a resonator base 9; a connecting port 9a for the gas laser medium; a distribution port 9b from the resonator base 9 to the mirror holding mounts 12a and 12b; a gas flow-through hole 9c provided inside the resonator base 9; a connecting gas feeding block 20 which includes a gas flow-through hole 20c; a resonator supporting rod 20a provided through the side walls thereof; a resonator supporting bearing 20b for supporting the resonator supporting rod 20a; a cooling ring 21 having a ring-shaped cooling water hole 21a therein; and a helical gas guiding plate 22.

The mirror holding mounts 12a and 12b are disposed at both end parts of the resonator base 9 and fixed on an upper flat face formed by the upper projected wing parts 9d of the resonator base 9 similar to FIG. 1.

The connecting gas feeding block 20 is fixed on the lower side face of the resonator base 9 near the end of its output mirror 3, and the rolling slider 11 is fixed on the lower side face near the end of its total reflecting mirror 4, and the resonator base 9 is supported by the rod supporting bearing 20b attached to the resonator supporting rod 20a provided on the side wall of the connecting gas feeding block 20 and the rolling slider 11.

The cooling ring 21 is attached on the outer side wall of the connecting gas feeding block 20 in a manner that they are placed coaxially. The helical gas guiding screw 22 extends over the whole length of the gas flow-through hole 9c from the connecting port 19a at the end of output mirror 3 down to the end of total reflecting mirror 4 of the resonator base 9. The twisting number of the helical gas guiding screw 22 is selected to be about an integer number.

Generally, the gas laser medium makes the gas tubing 7 expand and contract responding to temperature variations thereof during its passage through the gas supply tubing 7. On the other hand, the resonator base 9 is fixed to the gas tubing 7 only by the connecting gas feeding block 20 which is fixed by the resonator supporting rod 20a and the rod supporting bearing 20b. Therefore, the resonator optical axis is not deviated by the expansion and contraction of the gas tubing 7.

The cooling ring 21 evens the temperature distributions around the gas flow-through hole 9c of the resonator base 9 at the end of the output mirror 3, as well as the gas flow-through hole 20c of the connecting gas feeding block 20 uniform.

And, the gas laser medium flows with helical movements of the integer number during the passage through the gas flow-through hole 9c inside the resonator base 9, starting from the connecting port 9a down to the end of the total reflecting mirror 4. Thereby, any local heating or cooling of the resonator base 9 is avoided, and along the whole length of the resonator base 9 exhibits uniform temperature distribution following the temperature variation of the gas laser medium.

According to the above-mentioned second embodiment of the present invention, even if there is a temperature variation on the gas laser medium supplied to the resonator depending on the amount of the discharge input power, the expansion and contraction of the gas tubing 7 do not cause the deviation of the resonator optical axis. Furthermore, there is no fear of producing undesirable temperature unevenness over the surface of the resonator base 9, and thereby the resonator base 9 is always straight, hence assuring satisfactory alignment of the optical axis.

As is evident from the explanations on the embodiments of the present invention, according to the axial flow type laser oscillator of the present invention, even if temperature variations of the gas laser medium take place depending on the amount of the discharge input, it does not cause the distortion or deviation on the resonator optical axis. Such non occurrence of the distortion or deviation of the optical axis further suppresses the temperature variation itself of the gas laser medium. Thereby, an excellent axial flow type laser oscillator capable of issuing a stabilized output can be realized.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An axial flow type laser oscillator comprising:
 a laser resonator having a first gas discharge tube and a second gas discharge tube which are coaxially, serially and linearly connected to one another by a gas outlet block thereby forming an integrated gas discharge tube for generating electric discharges in a gas laser medium provided in said integrated gas discharge tube, an output mirror fixed at one end of said integrated gas discharge tube and a total reflection mirror fixed at another end of said integral gas discharge tube;
 a gas blower for circulating said gas laser medium through said first and second gas discharge tubes;
 gas supply tubings connecting said gas blower to said gas discharge tubes;
 gas outlet tubing connecting said gas outlet block to said gas blower;
 at least one gas laser medium temperature control unit connected to at least one of said gas supply tubings and gas outlet tubings;
 a discharge power supply for supplying power to generate said electric discharges;
 a resonator base having gas distribution paths defined therein so as to supply said gas laser medium from said gas supply tubings to a distal end of said first gas discharge tube and a distal end of said second gas discharge tube, said resonator base being disposed substantially parallel to said laser resonator and including holding members at ends thereof for holding said respective distal ends of said first and second gas discharge tubes; and a gas feeding block supporting an end of said resonator base and connected to said gas supply tubings.

2. An axial flow type laser oscillator in accordance with claim 1, wherein said gas feeding block has a gas intake port located on an outer face thereof and a distribution guiding means for distributing said gas laser medium to said one end of said integrated gas discharge tube and to said the other end of said integrated gas discharge tube.

3. An axial flow type laser oscillator in accordance with claim 1 further comprising a connecting gas feeding block attached to said gas supply tubing, said connecting gas feed block having a cooling member surrounding a gas flow-through hole defined therein for the passing said laser medium through said connecting gas feed block.

4. An axial flow type laser oscillator in accordance with claim 3, further comprising a helically-shaped guiding means located inside said resonator base.

5. An axial flow type laser oscillator in accordance with claim 1, further comprising:
upper projected wing parts and lower projected wing parts provided along on outer side faces of said resonator base, said upper projected wing parts and said lower projected wing parts having tips that are bent along said resonator base in a manner such that said tips of said upper projected wing parts oppose said tips of said lower projected wing parts, thereby defining groove-shaped spaces long said outer side faces of said resonator base, and
an air blower provided at an end face of said resonator base for producing cooling air streams in said groove shaped spaces.

6. An axial flow type laser oscillator comprising:
a laser resonator having a first gas discharge tube and a second gas discharge tube coaxially, serially and linearly connected to a gas outlet block thereby forming an integrated gas discharge tube for generating electric discharges in a gas laser medium provided in said integrated gas discharge tube, an output mirror fixed to a first end of said integrated gas discharge tube, and a total reflection mirror fixed to a second end of said integrated gas discharge tube;
a gas blower for circulating said gas laser medium through said integrated gas discharge tube;
gas supply tubing connecting said gas blower to said gas discharge tubes;
gas outlet tubing connecting gas outlet parts of said integrated gas discharge tubes to said gas blower,
at least one gas cooling unit connected to at least one of said gas supply tubing and gas outlet tubing;
a discharge power supply for supplying sufficient power to generate said electric discharges,
a resonator base having gas distribution paths defined therein, said gas distribution paths connecting said gas supply tubing to a distal end of said first gas discharge tube corresponding to said first end of said integrated gas discharge tube and connecting said gas supply tubing to said distal end of said second gas discharge tube corresponding to said second end of said integrated gas discharge tube, said resonator base being disposed substantially parallel to said laser resonator and including holding members at end parts thereof for holding respective first and second ends of said integrated gas discharging tube; and gas cooling means provided with flow-rate adjusting means for adjusting a flow-rate of a coolant medium, said gap cooling means being disposed at an output end of said gas blower, wherein said flow rate is adjusted corresponding to an output power set for said laser oscillator.

7. An axial flow type laser oscillator in accordance with claim 6 wherein said resonator base is substantially an oblong box having a gas flow-through hole defined therein, wherein said first and second includes a helical gas guiding plate located within said gas flow-through hole.

8. An axial flow type laser oscillator in accordance with claim 7, further comprising:
upper projected wing parts and lower projected wing parts, said upper and lower projected wing parts provided along outer side faces of the resonator base, said upper projected wing parts and said lower projected wing parts having tips that are bent along said resonator base in a manner such that said tips of said upper projected wing parts oppose said tips of said lower projected wing parts, thereby defining groove-shaped spaces along said outer side faces of said resonator base, and
an air blower provided at an end face of said resonator base for producing cooling air streams in said groove-shaped spaces.

9. An axial flow type laser oscillator in accordance with claim 6, further comprising:
upper projected wing parts and lower projected wing parts, said upper and lower projected wing parts provided along outer side faces of said resonator base, said upper projected wing parts and said lower projected wing parts having tips that are bent along said resonator base in a manner such that said tips of said upper projected wing parts oppose said tips of said lower projected wing parts, thereby defining groove-shaped spaces along said outer side faces of said resonator base, and
and air blower provided at an end face of said resonator base for producing cooling air streams in said groove-shaped spaces.

10. An axial flow type laser oscillator comprising:
a laser resonator having a first gas discharge tube and a second gas discharge tube which are coaxially, serially and linearly connected to one another by a gas outlet block thereby forming an integrated gas discharge tube for generating electric discharges in a gas laser medium provided in said integrated gas discharge tube, an output mirror fixed at one end of said integrated gas discharge tube and a total reflection mirror fixed at another end of said integral gas discharge tube;
a gas blower for circulating said gas laser medium through said first and second gas discharge tubes;
gas supply tubings connecting said gas blower to said gas discharge tubes;
gas outlet tubing connecting said gas outlet block to said gas blower;
at least one gas laser medium temperature control unit connected to at least one of said gas supply tubings and gas outlet tubings;
a discharge power supply for supplying power to generate said electric discharges;
a resonator base having gas distribution paths defined therein so as to supply said gas laser medium from said gas supply tubings to a distal end of said first gas discharge tube and a distal end of said second gas discharge tube, said resonator base being disposed substantially parallel to said laser resonator and including holding members at ends thereof for holding said respective distal ends of said first and second gas discharge tubes; and a gas feeding block supporting an end of said resonator base and connected to said gas supply tubings, wherein said gas feeding block has a gas intake port located on an outer face thereof and a distribution guiding means for distributing said gas laser medium to said one end of said integrated gas discharge tube and to said the other end of said integrated gas discharge tube.

11. An axial flow type laser oscillator comprising:

a laser resonator having a first gas discharge tube and a second gas discharge tube which are coaxially, serially and linearly connected to one another by a gas outlet block thereby forming an integrated gas discharge tube for generating electric discharges in a gas laser medium provided in said integrated gas discharge tube, an output mirror fixed at one end of said integrated gas discharge tube and a total reflection mirror fixed at another end of said integral gas discharge tube;

a gas blower for circulating said gas laser medium through said first and second gas discharge tubes;

gas supply tubings connecting said gas blower to said gas discharge tubes;

gas outlet tubing connecting said gas outlet block to said gas blower;

at least one gas laser medium temperature control unit connected to at least one of said gas supply tubings and gas outlet tubings;

a discharge power supply for supplying power to generate said electric discharges;

a resonator base having gas distribution paths defined therein so as to supply said gas laser medium from said gas supply tubings to a distal end of said first gas discharge tube and a distal end of said second gas discharge tube, said resonator base being disposed substantially parallel to said laser resonator and including holding members at ends thereof for holding said respective distal ends of said first and second gas discharge tubes;

a gas feeding block supporting an end of said resonator base and connected to said gas supply tubings; and a connecting gas feeding block attached to said gas supply tubing, said connecting gas feed block having a cooling member surrounding a gas flow-through hole defined therein for the passing said laser medium through said connecting gas feed block.

12. An axial flow type laser oscillator comprising:

a laser resonator having a first gas discharge tube and a second gas discharge tube which are coaxially, serially and linearly connected to one another by a gas outlet block thereby forming an integrated gas discharge tube for generating electric discharges in a gas laser medium provided in said integrated gas discharge tube, an output mirror fixed at one end of said integrated gas discharge tube and a total reflection mirror fixed at another end of said integral gas discharge tube;

a gas blower for circulating said gas laser medium through said first and second gas discharge tubes;

gas supply tubings connecting said gas blower to said gas discharge tubes;

gas outlet tubing connecting said gas outlet block to said gas blower;

at least one gas laser medium temperature control unit connected to at least one of said gas supply tubings and gas outlet tubings;

a discharge power supply for supplying power to generate said electric discharges;

a resonator base having gas distribution paths defined therein so as to supply said gas laser medium from said gas supply tubings to a distal end of said first gas discharge tube and a distal end of said second gas discharge tube, said resonator base being disposed substantially parallel to said laser resonator and including holding members at ends thereof for holding said respective distal ends of said first and second gas discharge tubes;

a gas feeding block supporting an end of said resonator base and connected to said gas supply tubings;

upper projected wing parts and a lower projected wing parts provided on outer side faces of said resonator base, said upper projected wing parts and said lower projected wing parts having tips that are bent along said resonator base in a manner such that said tips of said upper projected wing parts oppose said tips of said lower projected wing parts, thereby defining groove-shaped spaces long said outer side faces of said resonator base, and an air blower provided at an end face of said resonator base for producing cooling air streams in said groove shaped spaces.

* * * * *